J. C. DURBOROW.
Harvester Rake.
No. 78,654.
Patented June 9, 1868.
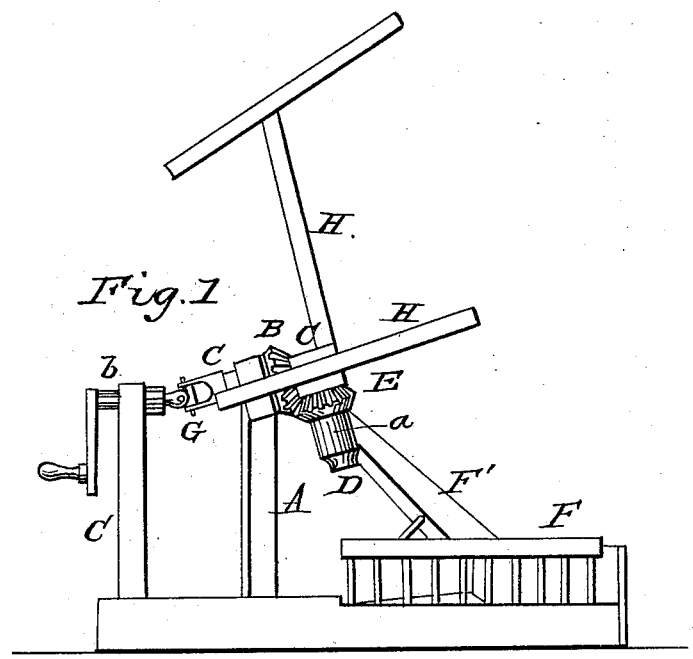
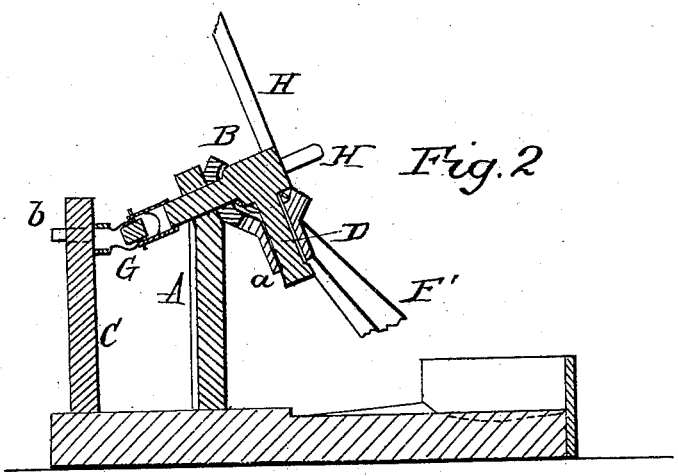

UNITED STATES PATENT OFFICE.

JOHN C. DURBOROW, OF ELLICOTT CITY, MARYLAND.

IMPROVEMENT IN HARVESTER-RAKES.

Specification forming part of Letters Patent No. 78,654, dated June 9, 1868.

*To all whom it may concern:*

Be it known that I, JOHN C. DURBOROW, of Ellicott City, in the county of Howard, and in the State of Maryland, have invented a new and useful Improvement in Harvester-Rakes; and I do hereby declare that the following is a full, clear, and exact description of the construction and operation of the same, reference being had to the accompanying drawings, making a part of this specification, in which—

Figure 1 is a front elevation. Fig. 2 is a transverse sectional view.

Like letters in both figures of the drawings indicate like parts.

The nature of my invention consists in operating a revolving rake upon a reaping or mowing machine on an inclined plane, by means of two beveled cog-wheels and a universal joint—one of the wheels being movable, the other stationary—through which passes and revolves the driving-shaft, which shaft is arranged and works on a line inclined about thirty degrees from a horizontal line to give better sweep to the rake; the line of the shaft of the movable wheel being at about right angles to the driving-shaft, the arm of the rake being also placed out of line from the shaft of the movable wheel, to improve the position and motion of the rake, the platform of the machine being made concave to conform to the revolving motion of the rake, thus giving the rake a continuous, easy, sweeping motion, instead of the irregular motion of the rakes now in use upon such machines.

To enable any one skilled in the art to make and use my invention, I will proceed to describe its construction and operation.

A is a standard, having the top thereof inclined at a suitable angle. B is the stationary beveled cog-wheel, of the proper diameter, and attached to the incline of the standard. C is the driving-shaft, passing through the incline of the standard and the wheel B, and having a short shaft, D, attached at right angles to the end thereof. E is the movable beveled cog-wheel, whose teeth mesh with those of the stationary one, and having a sleeve, *a*, constructed therewith, and through which sleeve the short shaft D is inserted. The said wheel is held thereon by the short shaft being diminished in diameter, so that the sleeve will come against a shoulder formed on the end thereof, the wheel being placed on the shaft first, and the shaft then properly attached to the shaft C.

F is the rake, the arm F' of which is attached to the sleeve, at such an angle from the same as will bring the rake to a line parallel with the front of the platform, the platform being slightly concave, to conform to the revolving motion of the rake.

It will be seen that by the inclination of the shafts C and D, the rake is caused to move on an inclined plane, which motion requires less concavity of the platform than if the rake moved on a vertical plane. The inclination of the shafts may be still increased, and thus require but little concavity in the platform.

The power is applied in a suitable manner to the short shaft *b*, which is arranged horizontally in a standard, *c*, and connects with the driving-shaft C by the universal joint G.

H are the reel-arms, which are attached to the driving-shaft, the end thereof being made square to receive them.

Having thus fully described my invention, what I claim therein as new, and desire to secure by Letters Patent, is—

The inclined shaft C, jointed at G, and provided with the fixed gear-wheel B, in combination with the revolving gear-wheel E and inclined rake and reel arms, all constructed and operated in the manner and for the purpose set forth.

As evidence that I claim the foregoing I have hereunto set my hand in the presence of two witnesses.

JNO. C. DURBOROW.

Witnesses:
W. Y. SELLECK,
W. BURRIS.